June 19, 1923.

O. R. MEINHOLDT

ICE TONGS

Filed Dec. 27, 1921

1,459,339

Inventor
O. R. MEINHOLDT

By Jack Ashley
Attorney

Patented June 19, 1923.

1,459,339

UNITED STATES PATENT OFFICE.

OTTO R. MEINHOLDT, OF DALLAS, TEXAS, ASSIGNOR OF ONE-HALF TO ERICH MEYHOEFER, OF DALLAS, TEXAS.

ICE TONGS.

Application filed December 27, 1921. Serial No. 524,855.

*To all whom it may concern:*

Be it known that I, OTTO R. MEINHOLDT, a citizen of the United States, residing at Dallas, in the county of Dallas and State of Texas, have invented certain new and useful Improvements in Ice Tongs, of which the following is a specification.

This invention relates to new and useful improvements in ice tongs.

The object of the invention is to provide a highly improved handle device for ice tongs. A particular object is to provide a device which is light in weight and adaptable to heavy uses.

Another object is to provide a device which has freedom of operation, and in which the handle and grappling arms are pivoted in such a way as to prevent lateral play therebetween.

A common objection to the ordinary ice tongs is that the grappling arms spread laterally on their pivotal connection, which permits the arms to project above the said connection when extended. This often causes the operator's hand to be pinched between the upper portions of the arms when the latter are retracted. A particular feature of the invention resides in means on the connecting links for preventing the arms from projecting above the pivotal connection when the same spread laterally and are extended.

Another feature resides in a tubular handle which is light in weight and which may be gripped with ease to the hand of the operator.

A construction designed to carry out the invention will be hereinafter described together with other features of the invention.

Figure 1:
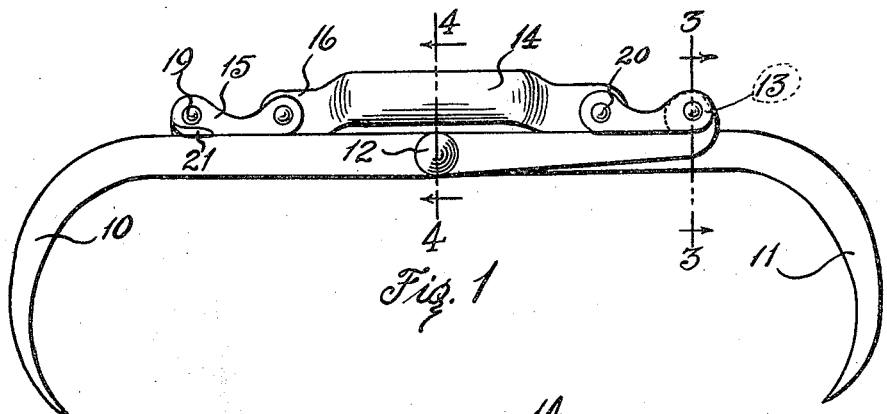
Figure 2:
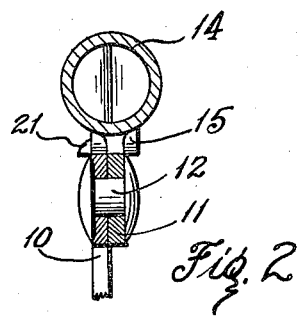
Figure 3:
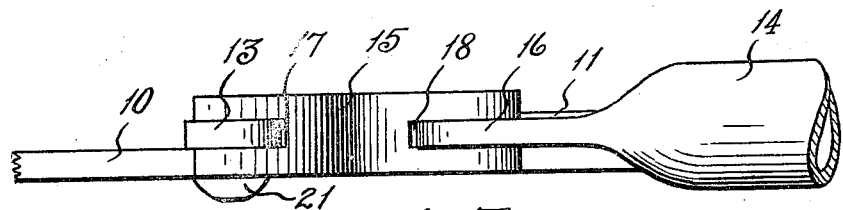
Figure 4:
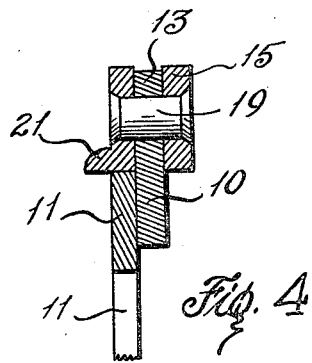

The invention will be more readily understood from a reading of the following specification and by reference to the accompanying drawings, in which an example of the invention is shown and wherein:

Fig. 1 is a side elevation of a pair of ice tongs extended and provided with a handle device constructed in accordance with my invention, Fig. 2 is a cross sectional view taken on the line 2—2 of Fig. 1, Fig. 3 is an enlarged plan view of a portion of the device, showing one of the connecting links, Fig. 4 is a cross sectional view taken on the line 4—4 of Fig. 1.

In the drawings the numeral 10 designates one of the grappling arms of a pair of ice tongs, and 11 the other arm. The arms are pivoted in the usual manner on a double headed rivet 12 or the like, and are provided with inwardly directed ears 13 on their upper ends, each of said ears having an aperture for receiving a pivot pin.

A device embodying my invention comprises a handle 14 and connecting links 15, said handle and links being made preferably of different metals, such as steel and brass. I prefer to make the handle of steel tubing and reduce or flatten the same at both ends to provide ears 16. The ears are curved slightly downwardly so as to hold the handle above the grappling arms when the same are extended, as is clearly shown in Fig. 1. Apertures are provided in the ears 16 so that pivot pins may be passed therethru.

The links 15 are preferably made of brass and have apertures in both ends which are countersunk from each side. The ends of the links are bifurcated to provide slots 17 and 18.

The ears 13 are received by the slots 17 so as to aline the apertures of the ears with the apertures in the lower end of the links. Suitable pins 19 are passed thru said apertures and riveted, whereby the ears of the grappling arms are pivoted in the links. The handle 14 is connected with the arms 10 and 11 by inserting the ears 13 in the slots 18 so as to aline the apertures of the ears with the apertures in the upper ends of the links, and passing therethru similar pins 20, whereby the said handle is pivoted to the links. It will be readily seen that by the links 15 being made of brass and the handle and grappling arms of steel, friction in the pivotal connections is reduced to a minimum, whereby the device is permitted to operate freely.

It will be readily seen in Figs. 3 and 4 that normally when the grappling arms are extended they engage the undersides of the links 15 and are thereby prevented from projecting above their pivotal point or the rivet 12. However, I provide a stop lug 21 on one side of each link. Each lug projects from the margin on the lower portion of a link, and is adapted to engage the arm carried by the opposite link when extended, should the said arms become loose so as to spread laterally on the rivet 12. By this arrangement it will be seen that the arms are prevented at all times from projecting above their pivotal point or the rivet 12, when extended, thus the hazard of the operator's being pinched between the upper portions of the said arms is eliminated.

It is evident that by the use of solid connecting links being bifurcated at each end, lateral play between the handle 14 and the grappling arms is substantially prevented, which makes a pair of ice tongs provided with a handle device embodying my invention much more serviceable and convenient to handle. The tubular handle is light in weight, but adaptable to heavy usage. It will be seen that the handle may be quickly grasped at all times and that the same is of such shape as to be gripped without discomfort to the hand of the operator.

It is desirable that the handle and links lie contiguous to the parallel shanks of the grappling arms when the tongs are opened to the position shown in Fig. 1. The operator is thereby enabled to grasp the middle of the tongs, extending his fingers around the said shanks and holding the handle 14 and the arms together. This is a favorite manner of carrying the tongs among ice men, as it will be seen that the device may be used as a hook when in this position for moving a block of ice or as a pick for chipping the same. Further, the tongs are in position to embrace a block of ice and by releasing the shanks and holding the handle 14 said arms readily swing together so that their pointed ends engage in the sides of said block. It will be seen that the offset pivotal ears 13 make it possible for the links and handle to assume a position parallel to the shanks of said arms when the latter are thus opened.

Various changes in the size and shape of the different parts as well as modifications, may be made without departing from the spirit of the invention.

What I claim, is:

In a pair of ice tongs, the combination of a pair of intersecting grappling arms pivoted together intermediate their ends, said arms having substantially straight shanks merging into inwardly curved lower ends, a pivotal ear integral with the upper end of each shank and offset laterally, a tubular handle having both ends flattened to provide pivotal elements, a pair of links pivotally receiving said elements in their upper ends and the said ears in their lower ends, whereby the said handle is pivotally connected to the said arms, the said links being adapted to lie contiguous to the said shanks when the latter are disposed in parallel relation by the open position of said arms, whereby the tongs may be grasped around the middle and the handle and shanks held together, and stop lugs integral with said links and projecting laterally therefrom to prevent the lower ends of the arms from moving above the pivotal point of the latter.

In testimony whereof I affix my signature

OTTO R. MEINHOLDT